United States Patent [19]

Franklin

[11] Patent Number: 5,396,756
[45] Date of Patent: Mar. 14, 1995

[54] AGRICULTURAL RAKE

[76] Inventor: Melvin Franklin, Box 284, Ardmore, Alberta T0A 0B0, Canada

[21] Appl. No.: 12,460

[22] Filed: Feb. 2, 1993

[51] Int. Cl.6 .................. A01D 19/02; A01D 78/14
[52] U.S. Cl. ........................... 56/366; 56/376; 56/396
[58] Field of Search ............ 56/366, 376, 396, 365, 56/370, 375; 171/63, 65

[56] References Cited

U.S. PATENT DOCUMENTS

| | | | |
|---|---|---|---|
| 3,217,481 | 11/1965 | Remy | 56/366 |
| 3,438,185 | 4/1969 | Van Der Lely | 56/366 |
| 3,443,644 | 5/1969 | Schindelka | 171/63 |
| 4,040,490 | 8/1977 | Anderson | 56/376 X |
| 4,206,812 | 6/1980 | Viel | 171/63 |
| 5,127,216 | 7/1992 | Kelderman | 56/366 X |

*Primary Examiner*—Terry Lee Melius
*Attorney, Agent, or Firm*—Terry M. Gernstein

[57] ABSTRACT

There is provided an agricultural rake which comprises a frame having front rear sections angled with respect to one another. A plurality of angled rake wheels are mounted on the rear section of the frame. The rake wheels are characterized by having a plurality of spaced apart tines extending from the periphery of the rake wheel.

4 Claims, 3 Drawing Sheets

AGRICULTURAL RAKE

FIELD OF THE INVENTION

The present invention relates to a windrower and more particularly to an agricultural rake adapted to dig up rocks, roots and the like and place them in a windrow for convenient removal thereof.

BACKGROUND OF THE INVENTION

Agricultural rakes adapted for towing through fields by means of a tractor have long been known in the art. Exemplary implements have been described and disclosed in U.S. Pat. Nos. 3,103,776 to Van Der Lely et al., 3,443,644 to J. C. Schindelka, 4,206,812 to F. W. Viel, and 4,040,490 to R. R. Anderson.

At the present time, the sole commercially available rakes, deleteriously, show a propensity to damage of the tines when the latter encounter rocks or the like in the ground. The reason for this ready damage would appear to reside in the fact that rake wheels of the prior art are functional to move only in a vertical direction when hitting obstacles. There exists, therefore, the need for a more rugged and durable rake.

SUMMARY OF THE INVENTION

In accordance with the present invention, there is provided a rake which is adapted for towing by means of a tractor.

The rake comprises a frame having a pair of front and rear wheels mounted thereon. At its forward end the frame which comprises an elongate bar member is angled inwardly to permit the rake wheels which are mounted on the rear end of the frame to be obliquely arranged with respect to the direction of travel. The preferred angle between front and rear sections of the frame would be 370°.

It is to be noted that one of the rear wheels is angularly mounted, on the near side of the rake ( the near side being defined as the side of the frame bearing the raking wheels) so as to enable the rake when in operation to eliminate any slowing down thereof because of drag forces.

The rake wheels are pivotally mounted on one side of the frame. Furthermore, the rake wheels are positioned angularly with respect to the rear section of the frame. Preferably, the wheels are mounted at an angle of 450° relative to the rear section of the frame. The rake wheels have a plurality of spaced apart tines projecting tangentially from the periphery thereof. The tines are angled at 20° from the circumferential edge. This provision ensures that rocks or the like do not get caught up between the tines.

Broadly stated the invention comprises a rake for digging up rocks and debris and laterally displacing them in a row, said rake being adapted for towing by a tractor which comprises a frame having a pair of front and rear wheel assemblies mounted thereon, said frame further comprising a front and rear section wherein said front section is angled inwardly from the rear section hydraulic means associated with said frame and said wheel assemblies, said means being adapted to raise and lower said frame and a plurality of spaced apart rake wheels angularly mounted on the rear section of said frame in parallel relationship one to another, said rake wheels further forming spaced apart tines projecting tangentially from the wheel periphery.

DESCRIPTION OF THE PREFERRED EMBODIMENT

Figure 1:
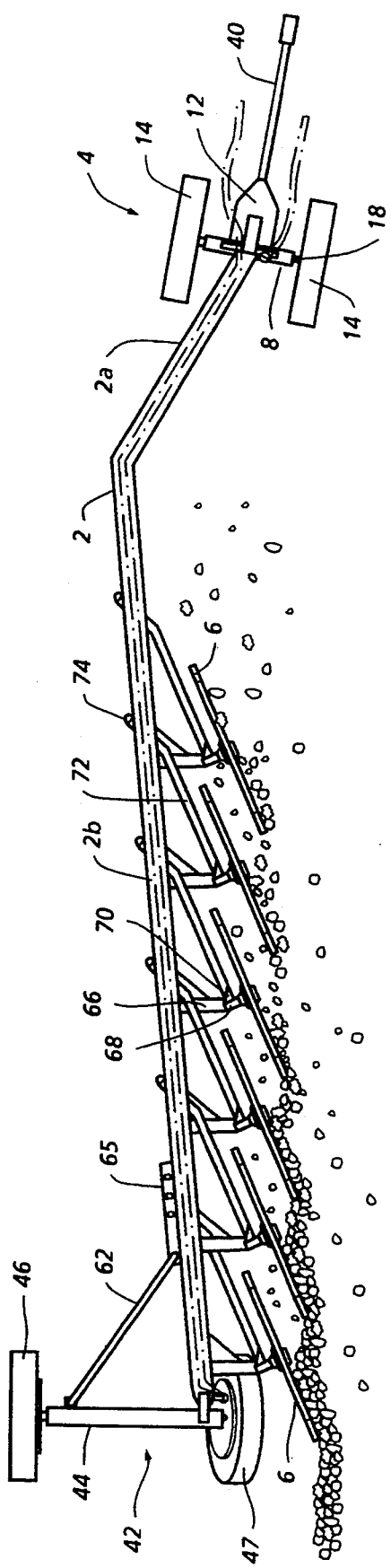
FIG. 1 is a plan view of the rake of the instant application.
Figure 2:
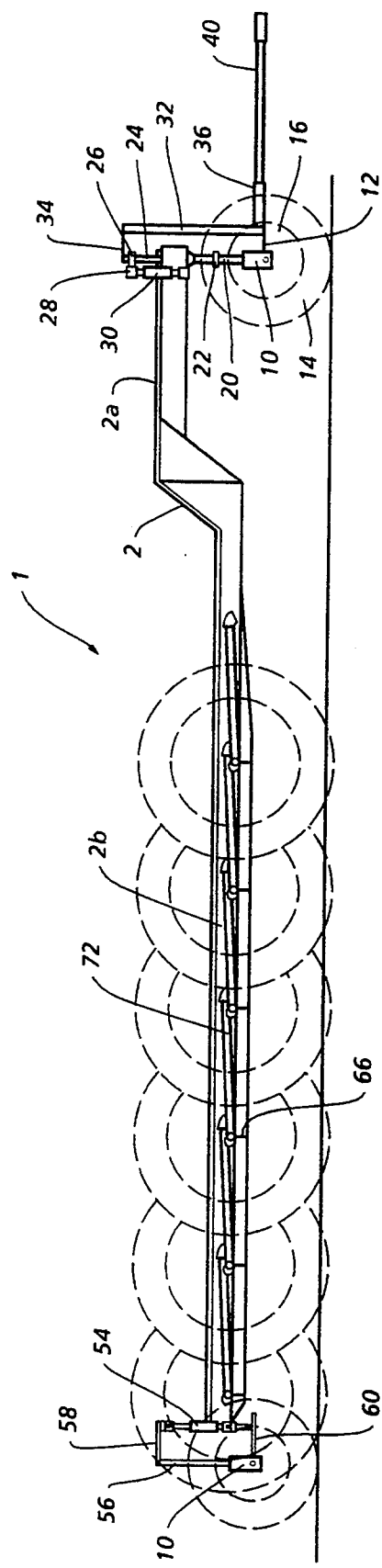
FIG. 2 is a side sectional view of the rake of FIG. 1.
Figure 3:
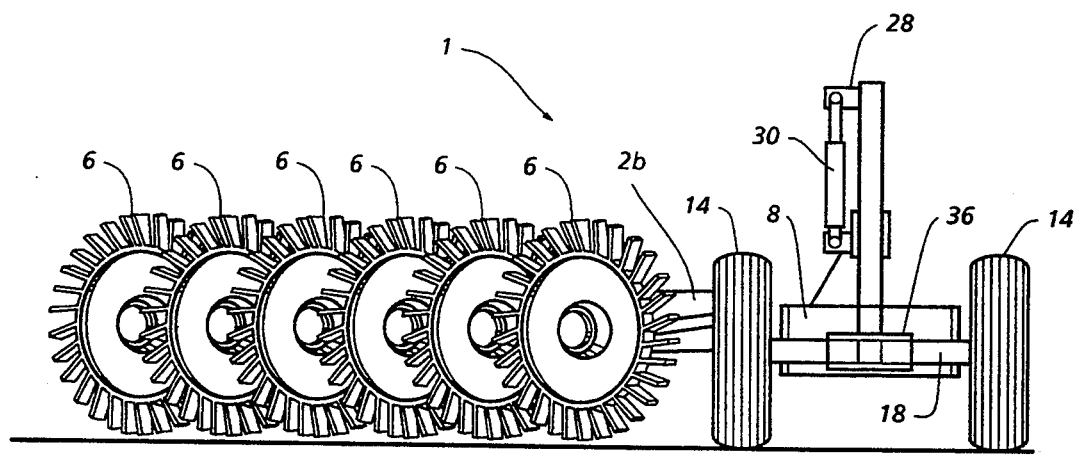
FIG. 3 is a front view of the rake of FIG. 1.
Figure 4:
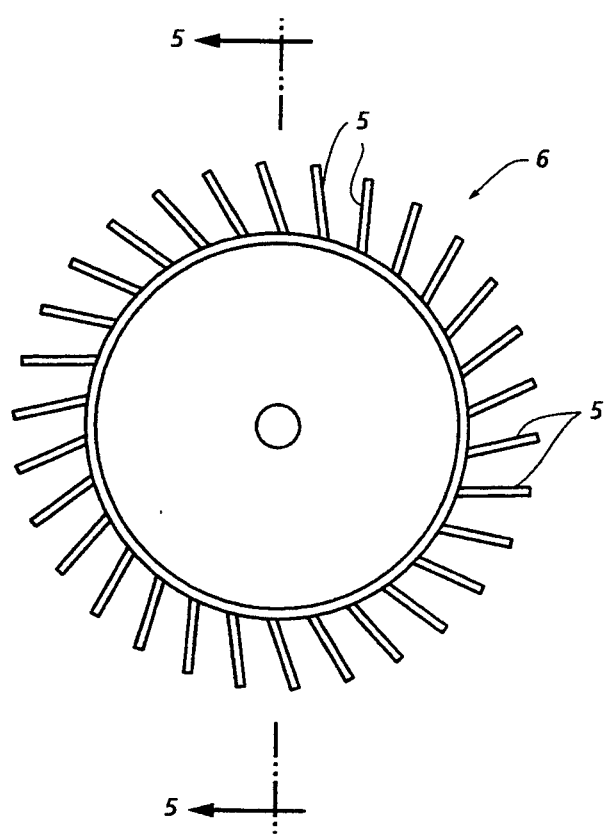
FIG. 4 is a front view of one of the rake wheels.
Figure 5:
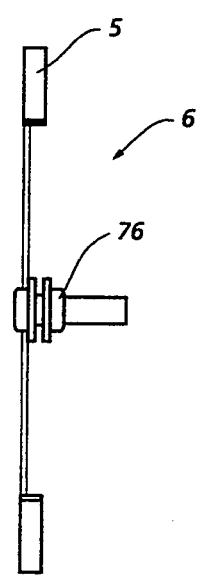
FIG. 5 is a side view of the rake wheels.

Having reference to the accompanying drawings, there is shown the rake 1.

The rake 1 comprises an elongate frame 2 wherein the front section 2a is angled inwardly at an angle of 37° on the near side, with respect to the rear section 2b.

At the front section of the frame 2 there is provided a wheel assembly 4. This wheel assembly 4 is connected to the frame 2 in such a manner that the frame 2 may be lowered or raised so as to position the tines 5 on the rake wheels 6 into or out of contact with the ground. A circular bore (not shown) is defined at the front of the frame 2a extending longitudinally therethrough.

There is provided a front axle housing 8 having vertically disposed end plates 10 and a forwardly extending horizontal base plate 12. The tires 14 and wheels 16 are mounted on an axle 18 which rotates within the housing 8. A central circular bore is formed in the axle housing 8 and receives a pipe 20 having a circumferential flange 22. A vertical rod 24 extends through the pipe 20. Slidably mounted on the rod 24 there is a second pipe (not shown), which is in turn encircled by a third pipe 26. This latter also has affixed to it an attachment plate 28.

The rod 24 extends slidably through the above-mentioned circular bore formed at the front of the frame. A hydraulic cylinder 30 is affixed at one end to the attachment plate 28 and at its other end to the frame 2. Thus, actuation of the cylinder 30 will raise or lower the frame relative to the wheel assembly 4. In front of the rod 24 there is positioned a support bar 32. The bar 32 is interconnected to the rod 24 at its upper end by means of a plate 34. At its lower end, the support bar 24 rest on the plate 12. Secured to the front end of plate 12 is a yoke 36 through which extends a roll bar 38. The drawing bar 40, for connection with the tractor, is secured to the yoke 36.

Figure 6:
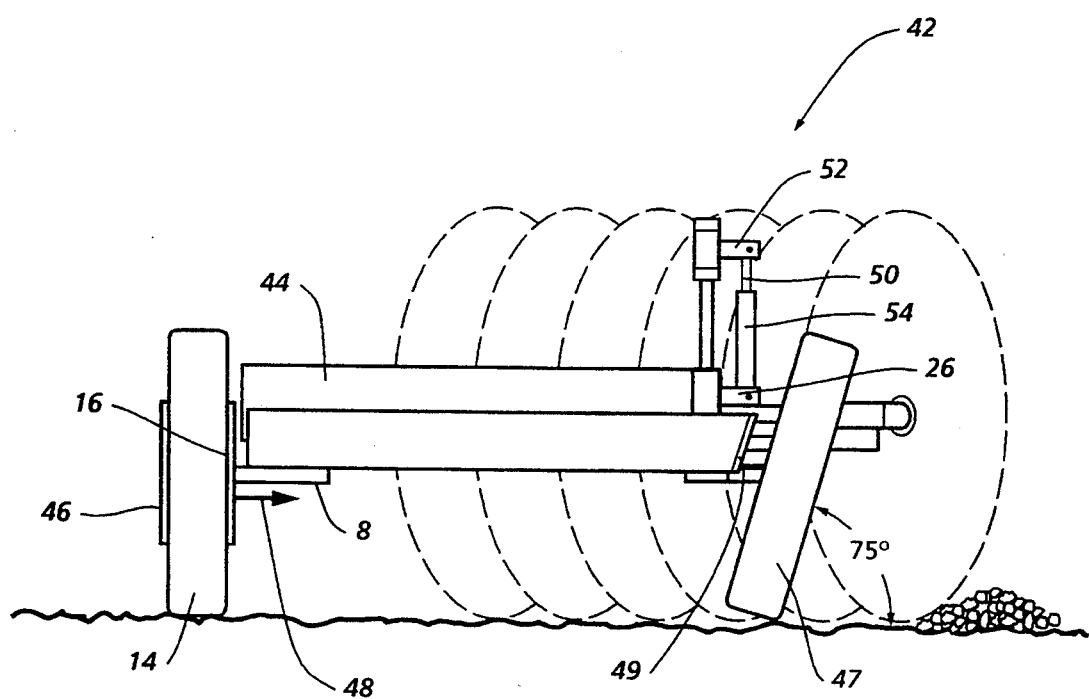
FIG. 6 is a rear view of the rake of FIG. 1.

Having reference to FIG. 6 wherein the rear wheel assembly 42 is detailed. Whilst similar in structure to the front wheel assembly 4, in being provided with hydraulic raising and lowering means, nevertheless there exist certain differences.

There is provided the axle housing 44. The farside wheel 46 is conventionally mounted perpendicularly to the vertical plate 48 mounted at the edge of the housing 44. The wheel 46, tire, 14 hub 16 are mounted on the axle 8.

The nearside wheel 47, however, is mounted at an angle of 15° to the vertical. The end plate 49 on the nearside like-wise is angled at 150°. Through a bore in the plate 49 extends the axle 8. A central circular bore (not shown) is formed in the axle housing 44 and receives a pipe having a circumferential flange. A vertical rod 50 extends through the pipe. Slidably mounted on the rod there is a second pipe, which is in turn encircled by a third pipe. This latter also has affixed to it an attachment plate 52.

The rod 50 extends slidably through the above-mentioned circular bore formed at the rear of the frame. A hydraulic cylinder 54 is affixed at one end to the attachment plate 52 and at its other end to the frame 2b. Thus, actuation of the cylinder will raise or lower the frame relative to the wheel assembly. Behind the rod 50 there is positioned a support bar 56. The bar 56 is interconnected to the rod 50 at its upper end by means of a plate 58. At its lower end, the support bar 56 rests on the plate 60. A support strut 62 extends between the rear axle housing 44 and an outwardly extending plate 65 mounted on the frame 2.

The rake wheels 6 are mounted on the frame 2 as follows.

A support arm 66 is secured to the frame extending perpendicularly therefrom. Mounted at the outer end of said support arm 66 is a pipe 68. A gusset 70 is secured to the pipe 68 and is adapted to rotatably receive the end of a bent rod 72. At its inner end, the rod 72 is bent at an angle of 27° where it is rotatably received in a bushing 74 which bushing is mounted through the frame 2.

The rake wheel 6 is mounted on the outside of the pipe 68 by means of a roller 76. The positioning of pipe 68 at an angle of 180° to the rod and bending of the rod result in the rake wheels 64 being at a 45° to the rear section of the frame.

On the outer circumference are placed a plurality of spaced apart tines 5. The tines 5 extend tangentially from the periphery extending at an angle of 20° relative to the diameter. For a rake wheel of 39 inches diameter the tines would be spaced 41/16 inches apart.

The embodiments of the invention in which an exclusive property or privilege is claimed are defined as follows:

1. A rake for digging up rocks and debris and laterally displacing them in a row, said rake being adapted for towing by a tractor which comprises:

a frame having a pair of front and rear wheel assemblies mounted thereon, said frame further comprising a front and rear section wherein said front section is angled inwardly from the rear section;

hydraulic means associated with said frame and said wheel assemblies, said means being adapted to raise and lower said frame; and a plurality of spaced apart rake wheels angularly mounted on the rear section of said frame in parallel relationship one to another, said rake wheels further forming spaced apart tines projecting tangentially from the wheel periphery.

2. The rake as set forth in claim 1 wherein said rake wheels are angled at 450° relative to the rear section of said frame.

3. The rake as set forth in claim 2 wherein said tines are mounted at an angle of 20° relative to the diameter of said rake wheels.

4. The rake as set forth in claim 1 wherein the wheel of said rear wheel assembly on the same side of the frame bearing said rake wheels is angled at about 15 degrees relative to the vertical.

* * * * *